United States Patent
Gangnet et al.

(10) Patent No.: US 7,427,994 B2
(45) Date of Patent: *Sep. 23, 2008

(54) COLOR GRADIENT PATHS

(75) Inventors: Michel J. Gangnet, Cambridge (GB);
Michael Kallay, Bellevue, WA (US);
Andrew Y. Wu, Dix Hills, NY (US);
Eric J. Stollnitz, Seattle, WA (US);
Devon L. Strawn, Redmond, WA (US);
John Michael Lounsbery, Bellevue, WA (US); Patrick Perez, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/167,882

(22) Filed: Jun. 27, 2005

(65) Prior Publication Data

US 2005/0237341 A1 Oct. 27, 2005

Related U.S. Application Data

(63) Continuation of application No. 10/601,428, filed on Jun. 23, 2003, now Pat. No. 7,038,697, which is a continuation-in-part of application No. 10/417,937, filed on Apr. 16, 2003, now Pat. No. 6,856,705.

(60) Provisional application No. 60/450,078, filed on Feb. 25, 2003.

(51) Int. Cl.
*G09G 5/02* (2006.01)
(52) U.S. Cl. .................. 345/606; 345/581; 345/421
(58) Field of Classification Search ............. 345/582, 345/581, 421, 606
See application file for complete search history.

(56) References Cited

U.S. PATENT DOCUMENTS

| 5,333,248 A | 7/1994 | Christensen |
| 5,339,387 A | 8/1994 | Frankel |
| 5,367,617 A | 11/1994 | Goossen et al. |

(Continued)

FOREIGN PATENT DOCUMENTS

EP  0872811  3/1998

(Continued)

OTHER PUBLICATIONS

Alyn Rockwood, et al. "Real-Time Rendering of Trimmed Surfaces". Silicon Graphics Computer Systems, Mountain View, CA, Computer Graphics, vol. 23, No. 3, Jul. 1989.

(Continued)

*Primary Examiner*—Kee M. Tung
*Assistant Examiner*—Javid A Amini
(74) *Attorney, Agent, or Firm*—Amin, Turocy & Calvin, LLP

(57) ABSTRACT

A system and method for generating color gradients is provided. The system generates color gradients using techniques from geometric surface modeling. The system and method of the present invention allow designers to specify very complex gradients in a simple way. The system can employ, for example, a vector-based interpolation method and/or a pixel-based partial differential equation (PDE) interpolation methods to facilitate generation of the color gradients. In one example, input boundary curves and/or feature curves are approximated by line segments, which are then utilized to generate a triangulation approximating a smooth color gradient.

18 Claims, 17 Drawing Sheets

U.S. PATENT DOCUMENTS

| | | | |
|---|---|---|---|
| 5,592,599 A * | 1/1997 | Lindholm | 345/427 |
| 5,701,404 A | 12/1997 | Stevens et al. | |
| 5,982,381 A | 11/1999 | Joshi et al. | |
| 5,982,384 A * | 11/1999 | Prouty et al. | 345/441 |
| 6,106,466 A * | 8/2000 | Sheehan et al. | 600/443 |
| 6,121,976 A | 9/2000 | Lu | |
| 6,271,861 B1 * | 8/2001 | Sargent et al. | 345/589 |
| 6,313,840 B1 * | 11/2001 | Bilodeau et al. | 345/423 |
| 6,393,145 B2 | 5/2002 | Betrisey et al. | |
| 6,516,277 B2 * | 2/2003 | Edgecombe et al. | 702/27 |
| 6,563,501 B2 * | 5/2003 | Sfarti | 345/442 |
| 6,625,311 B1 * | 9/2003 | Zhu | 382/173 |
| 6,784,896 B1 * | 8/2004 | Perani et al. | 345/589 |
| 6,856,705 B2 | 2/2005 | Perez et al. | |
| 2004/0090437 A1 | 5/2004 | Uesaki et al. | |

FOREIGN PATENT DOCUMENTS

| | | |
|---|---|---|
| EP | 0949591 | 3/1999 |
| EP | 0949591 A2 * | 3/1999 |

OTHER PUBLICATIONS

George Celniker, et al, "Deformable Curve Surface Finite-Elements for Free-Form Shape Design," Schlumberger Laboratory for Computer Science, Jul. 1991, 10 pgs, Cambridge, MA.

William Welch, et al., "Variational Surface Modeling," School of Computer Science Carnegie Mellon University, 1992, 10 pgs, Pittsburgh, PA.

Coloma Ballester, et al., "Filing-In by Joint Interpolation of Vector Fields and Gray Levels," IEEE Transactions on Image Processing, Aug. 2001, pp. 1200-1211, vol. 10, No. 8.

Murray, et al., "Graphics Data," http://netghost.narod.ru/gff/graphics/book/ch01_03.htm, 1996.

European Search Report, EP30047RK900peu, mailed Feb. 11, 2005.

* cited by examiner

COLOR GRADIENT PATHS

CROSS-REFERENCE TO RELATED APPLICATIONS

This application is a continuation of U.S. patent application Ser. No. 10/601,428, filed Jun. 23, 2003, entitled "COLOR GRADIENT PATHS," which is a Continuation-in-Part application of U.S. patent application Ser. No. 10/417,937, now U.S. Pat. No. 6,856,705, filed on Apr. 16, 2003, entitled "IMAGE BLENDING BY GUIDED INTERPOLATION," which is an application claiming benefit under 35 U.S.C. §119(e) to U.S. Provisional Patent Application Ser. No. 60/450,078, filed on Feb. 25, 2003, entitled "IMAGE BLENDING BY GUIDED INTERPOLATION." The entireties of the above-noted applications are incorporated herein by reference.

TECHNICAL FIELD

The present invention relates generally to computer graphics, and, more particularly to a system and method to facilitate smooth color gradient(s) by employing color gradient path(s).

BACKGROUND OF THE INVENTION

Many computer paint and drawing programs allow a user to fill an area with a single and/or multiple colors. In the case of multiple colors, computer paint programs can automatically blend between the colors specified. This smooth blending between colors produces a color gradient. Conventional types of color gradients include linear gradients, radial gradients, and gradient meshes.

To fill a region with a linear gradient, a line segment is specified (e.g., on the drawing canvas) and colors are associated with points along the line segment. For example, one endpoint of the line segment can be mapped to blue, the other endpoint can be mapped to red, and an intermediate point on the line segment can be mapped to yellow. The color at any other point on the line segment is determined by interpolating (e.g., using linear or cubic interpolation) between the specified colors. At any other point in the region to be filled, the color is defined to be the same as the color of the nearest point on the line segment. The user can choose multiple colors along the line segment and can specify the technique used to interpolate between colors, but a linear gradient is defined by a single line segment. The linear gradient is the most basic gradient of all and is typically not complex enough for advanced effects.

Radial gradients can be used to create slightly more complex effects than linear gradients. To create a radial gradient, a line segment is specified by selecting an initial point and an end point. As with linear gradients, colors are associated with points along the line segment, and the color of any intermediate point on the line segment is determined by interpolating between the specified colors. However, unlike linear gradients, the color of any other point in the region to be filled is determined according to its distance from the initial point of the line segment. Thus, the resulting radial gradient comprises generally concentric rings of color that vary (e.g., smoothly and continuously). Along the initial line segment, colors blend smoothly as they do in the case of linear gradients. Points on other rays that begin at the initial point are colored in the same way, according to their distance from the initial point.

A gradient mesh is created using a two dimensional Bèzier surface, specified by a mesh of control points, each of which is associated with a color. Each point in the region to be filled is colored by interpolating between the colors of nearby control points, using standard Bèzier surface evaluation. The mesh gradient is more advanced than both linear and radial gradients; however, complex mesh gradients put a heavy burden on the users, as they can only be achieved by specifying the positions and colors of many control points.

Thus, linear and radial gradients are easy to use and to specify, but they typically generate simple color gradients. A gradient mesh is more powerful, but is more difficult for designers to use. For example, in order to imitate the smooth gradation of color produced by an airbrush, the user is forced to think about increasing the complexity of the control mesh, rather than simply drawing a color curve. It is also difficult to define a mesh gradient to fill a non-rectangular region, since Bèzier surfaces are typically defined using quadrilateral meshes. Achieving a desired appearance is also time-consuming and non-intuitive, since more complicated effects generally require the user to individually move and color many control points.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system and method to facilitate generation of smooth color gradients using techniques from geometric surface modeling. The system and method of the present invention allow designers to specify very complex gradients in a simple way. A visual designer can edit the color gradient after it is created, and these color gradients can be generated (e.g., very quickly) in accordance with an aspect of the present invention. The resulting color gradient has smoothly varying colors and scales well across various output devices (e.g., form factors and/or display configurations). Color gradients generated in accordance with the present invention enable users to quickly and easily create rich and smooth color gradients that can be efficiently drawn using computer graphics hardware.

One aspect of the present invention provides for graphic representations of color gradients to have a compact representation when compared with conventional graphic representations of gradients. Thus, unlike bitmaps, which often contain a large quantity information, graphic representations based on color gradients generated in accordance with the present invention can be compact; a color gradient generated in accordance with the present invention can be specified using a small amount of data (e.g., amenable to XML markup). Using any suitable transmission format (e.g., markup language), color gradient graphics can be quickly transmitted across computer networks.

In accordance with yet another aspect of the present invention, color gradient graphics facilitate scalability of graphic representations. Whereas a computer that has a high-resolution display can render color gradients as richly as desired, a pocket-sized computer can render a simpler version that is suited for display on small or grayscale screens.

Further, unlike traditional vector graphics, which are usually regarded as flat and cartoon-like, graphics built using color gradients generated in accordance with the present invention can appear as visually rich as bitmap graphics. Yet, vector graphics can build on color gradient, resulting in compact vector graphic representations with rich and smooth color gradients. Thus, in accordance with an aspect of the present invention, color gradients generated in accordance with the present invention can be built top of vector graphics and/or bitmap/raster graphics. Thus, color gradients generated in accordance with the present invention can coexist with previous standards yet offer richer graphics and easier editing experiences.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
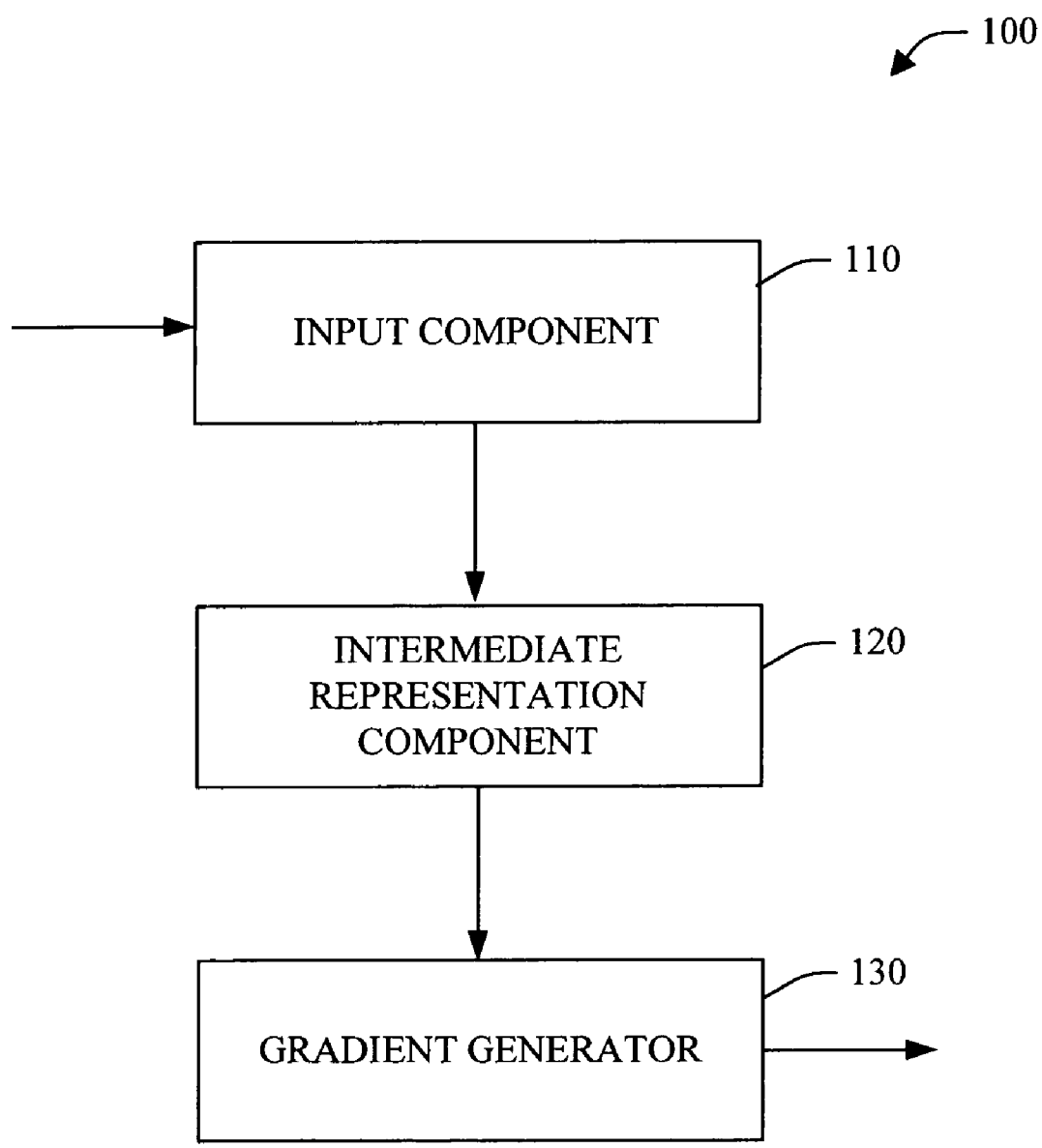
FIG. 1 is a block diagram of a color gradient generation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, a "path" is a two-dimensional curve that can be represented in any suitable manner. For example, well-known two-dimensional curves include Bèzier curves, B-Splines, polylines (e.g., a set of line segments where the end of one line segment connects to the beginning of the next line segment, except for the last line segment) and Hermite splines. A path has an associated set of colors that map to points on the path. Each point on the path either has a color directly associated with it, or it has a color that is interpolated based on the location of the point on the path.

As discussed above, traditional methods for defining color gradients involve specification of a single line segment or of a complex surface mesh such as a two dimensional Bèzier surface. Linear gradients and radial gradients are specified simply with one single line segment and a set of associated colors, but they produce only simple color gradients. A gradient mesh that uses a two dimensional Bèzier surface offers more flexibility, but is hard to create and edit. The present invention offers a way to specify smooth color gradients in a much more general way that is easy to create and edit, and fast for the computer to display.

Referring to FIG. 1, a color gradient generation system 100 in accordance with an aspect of the present invention is illustrated. The system 100 employs color gradient paths to generate smooth color gradients. The system 100 allows designers to specify very complex gradients in a simple way. The system 100 can employ, for example, a vector-based interpolation method and/or a pixel-based partial differential equation (PDE) interpolation method. For example, the system 100 can employ different interpolation methods (e.g., algorithms) based, at least in part, upon systems and/or users utilizing the system 100. Thus, for a raster-centric drawing program, the system 100 can employ a pixel-based PDE interpolation method, whereas for a vector-centric illustration package a vector-based interpolation method can be employed.

The system 100 can employ well-known techniques from the field of computer graphics, specifically free-form shape design and geometric surface modeling. Free-form shape design is often used in computer aided geometric design (CAGD) for modeling three-dimensional objects. In order to model a geometric surface in three-dimensions, designers specify constraint curves in three-dimensions. A computer program then constructs a smooth interpolating surface that passes through all the constraint curves. It chooses the surface that minimizes some measure of smoothness and/or curvature. This is known as variational surface modeling, and has only been applied to modeling geometric surfaces in three-dimensions. The system 100 constructs a smooth surface that interpolates the colors. The system 100 can use traditional geometric surface reconstruction techniques in a novel way to generate smooth color gradients. The resulting color gradient has smoothly varying colors and scales well across various output devices (e.g., form factors and/or display configurations).

Figure 2:
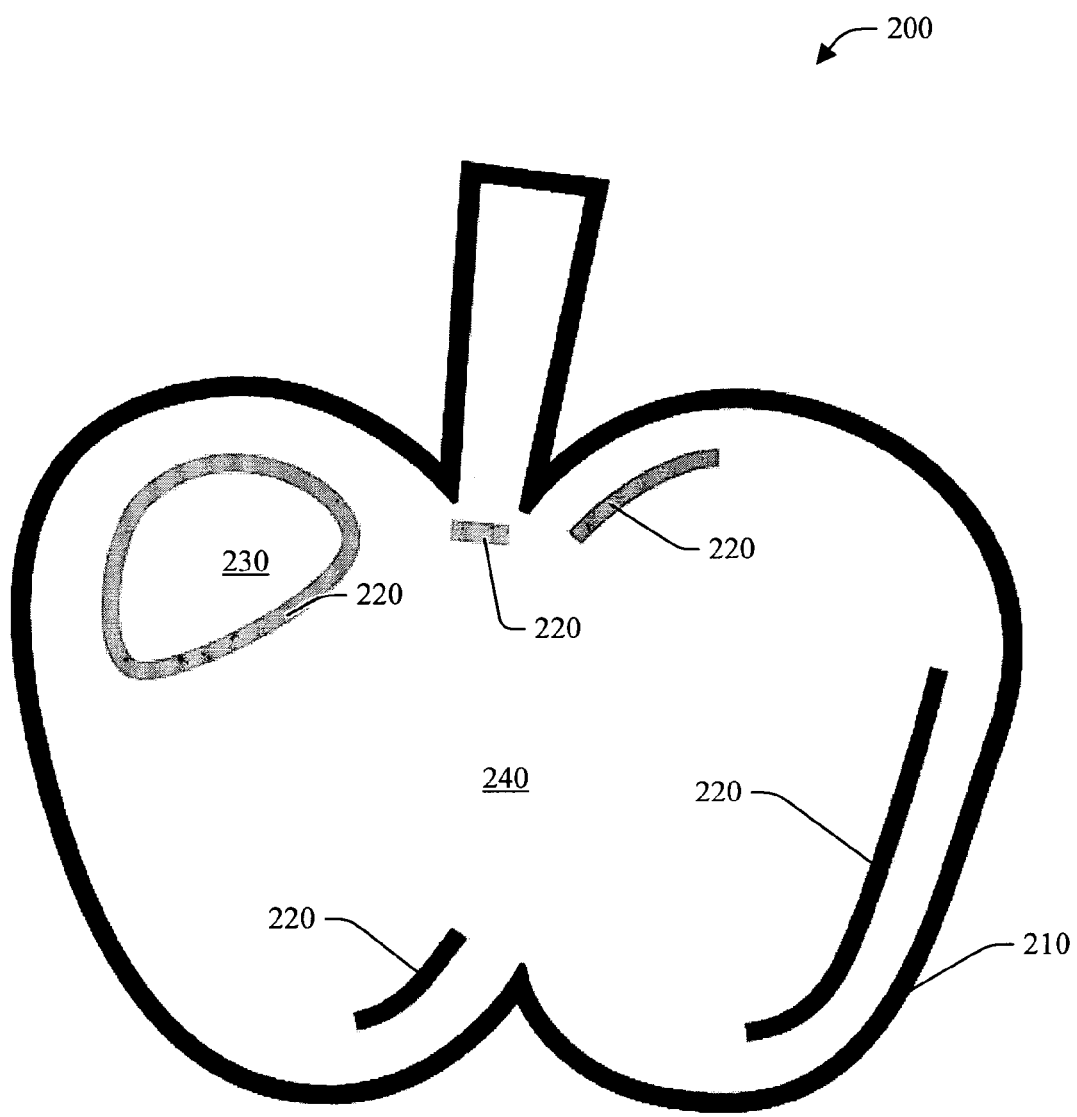
FIG. 2 is a diagram of an exemplary system input in accordance with an aspect of the present invention.

Turning briefly to FIG. 2, an exemplary system input 200 in accordance with an aspect of the present invention is illustrated. The system input 200 includes an outer boundary curve 210 (e.g., path). In this example, the calculated color gradient generated in accordance with the present invention (e.g., by the system 100) is constrained to lie within the outer boundary curve 210. The outer boundary curve 210 is closed and contains inner curves 220, also known as "feature curves."

The feature curves 220 are a set of zero or more curves contained within the outer boundary curve 210. Each feature curve 220 may be open or closed, and generally the feature curves do not intersect. However, intersecting feature curves 220 can be decomposed into a set of mutually-disjoint non-intersecting curves that meet at the points of intersection.

A hole 230 is a region within the outer boundary curve 210 that is removed from the final color gradient. A hole is typically specified (e.g., based, at least in part, upon user input) by identifying a closed feature curve whose interior is to remain unfilled.

The interior 240 is the set of points within the outer boundary curve 210, excluding any points along the feature curves 220. For a non-simple outer boundary curve 210, the interior 240 can be defined using a form of fill rule (e.g., defined in the same ways that a curve is filled for traditional Bèzier curve and/or polygon rendering).

Note that the curves comprising the feature curves 220 and the outer boundary curve 210 are one-dimensional objects, as they can each be parameterized using a single argument in the form f: t→(x,y,color). The result of filling the interior is a two-dimensional object, since it requires two arguments and is parameterized as g: (x,y)→color. This is true whether the output is stored as a triangulation (e.g., vector approach) or as a raster (e.g., PDE approach).

Returning to FIG. 1, in one example, the system 100 follows the constraints of: (1) maintaining containment relationships, (2) near features have more influence than far features, and (3) the output is resolution independent. The mathematical description of color gradient path interpolation is inherently resolution-independent, in the same way that the mathematical description of a line is resolution-independent. With regard to the PDE interpolation method, the "perfect" solution for gradient path interpolation is achieved by solving the PDE with finer and finer grids, approaching a differential patch with infinitesimally small area. However, due to computational costs associated with the perfect solution, an approximation of the perfect solution is computed by the system 100. Similarly, for the vector-based interpolation approach, the area to which the resultant gradient paths are to be applied is sub-divided an infinite number of times to approach the perfect solution. Fortunately, the inherent smoothness of the solution means that an approximate solution is generally sufficient and if solved to a high enough precision, perceptually indistinguishable from higher-accuracy solutions.

Thus, in accordance with an aspect of the present invention, the system 100 computes and stores an approximation of the perfect solution (e.g., via vector-based interpolation and/or the PDE approach), thus yielding a perceptually resolution-independent output. That is, the resolution limits of the display surface (e.g., CRT, LCD, monitor and/or printer) are exploited. Generally, display surfaces have a finite number of dots per inch (DPI), limiting the amount of information that they can display. These physical limits have the effect of diminishing returns for solving the color gradient path interpolation at any resolution higher than that which the display surface can display.

In one example, for ease of implementation, outer boundary curves are closed and feature curves are non-intersecting and fully contained within the outer boundary curves. However, the system 100 can include pre-processing of outer boundary curves and/or feature curves to modify any invalid curves to conform to these constraints. For example, if two or more feature curves intersect, they can be broken up into sub-curves with common endpoints at the points of intersection.

Figure 3:
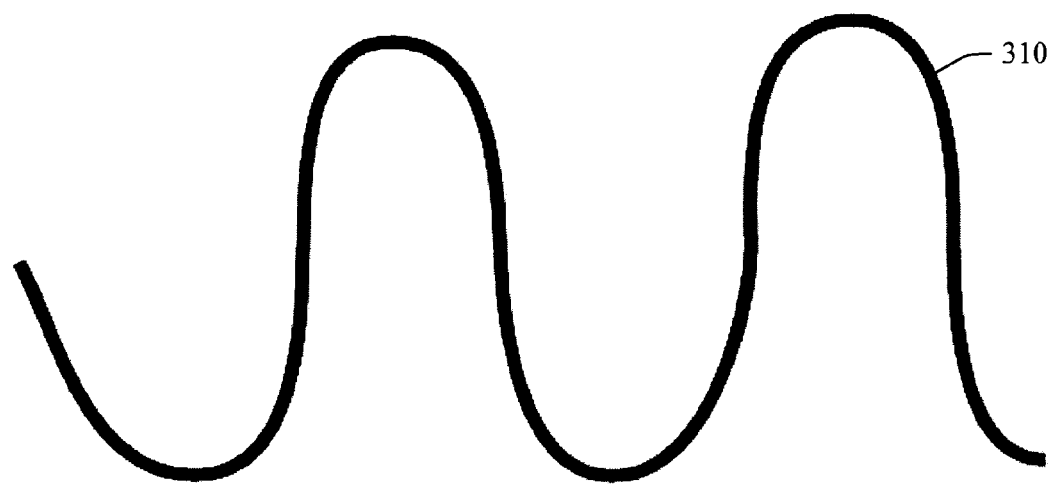
FIG. 3 is a diagram of an exemplary invalid system input comprising an open boundary curve in accordance with an aspect of the present invention.

Referring briefly to FIGS. 3-9, exemplary system inputs and associated system outputs are illustrated in accordance with aspects of the present invention. FIG. 3 illustrates an exemplary invalid system input comprising an open boundary curve 310. In one example, a system input comprising the open boundary curve 310 yields substantially no system output (e.g., no color gradient generated by system 100).

Figure 4:
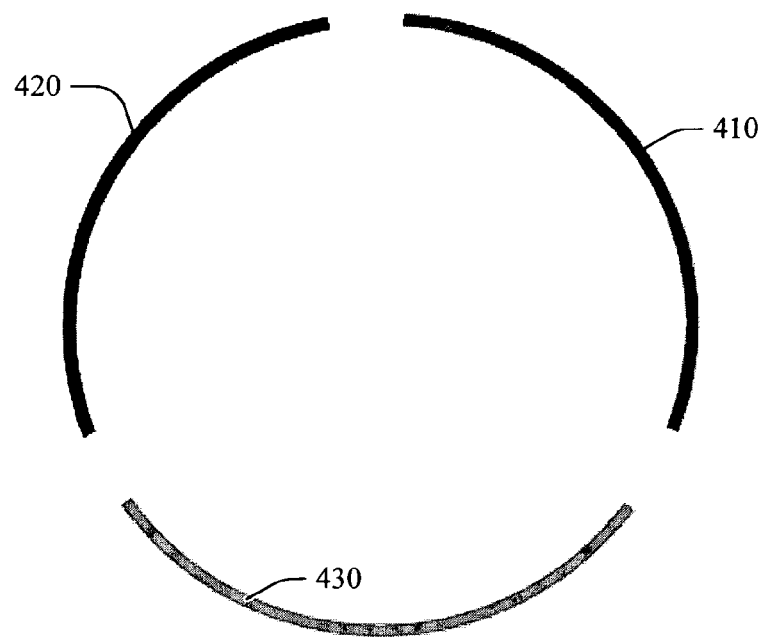
FIG. 4 is a diagram of an exemplary invalid input comprising boundary curves that form a nearly closed circle in accordance with an aspect of the present invention.

Next, FIG. 4 illustrates an exemplary invalid input comprising boundary curves 410, 420, 430 that form a nearly closed circle. In one example, a system input comprising the boundary curves 410, 420 and 430 would yield substantially no system output (e.g., no color gradient generated by system 100). In another example, a system input comprising the boundary curves 410, 420 and 430 are pre-processed by the system and the user is prompted and/or otherwise requested to provide information (e.g., to close the gaps between the boundary curves 410, 420 and 430).

Figure 5:
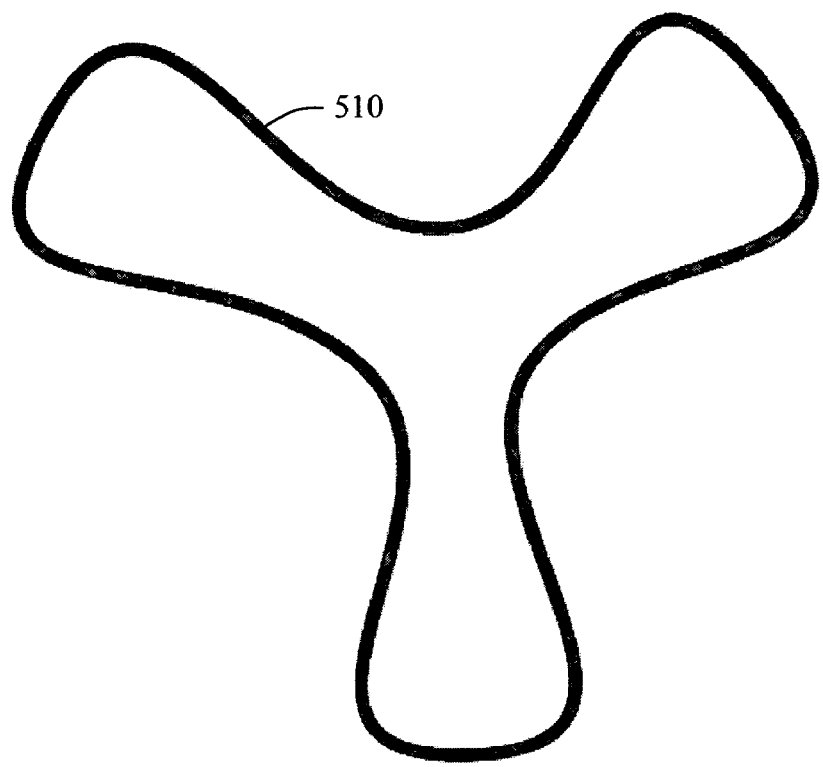
FIG. 5 is a diagram of an exemplary system input comprising a uniform color outer boundary curve and no feature curves and an associated system output in accordance with an aspect of the present invention.
Figure 5:
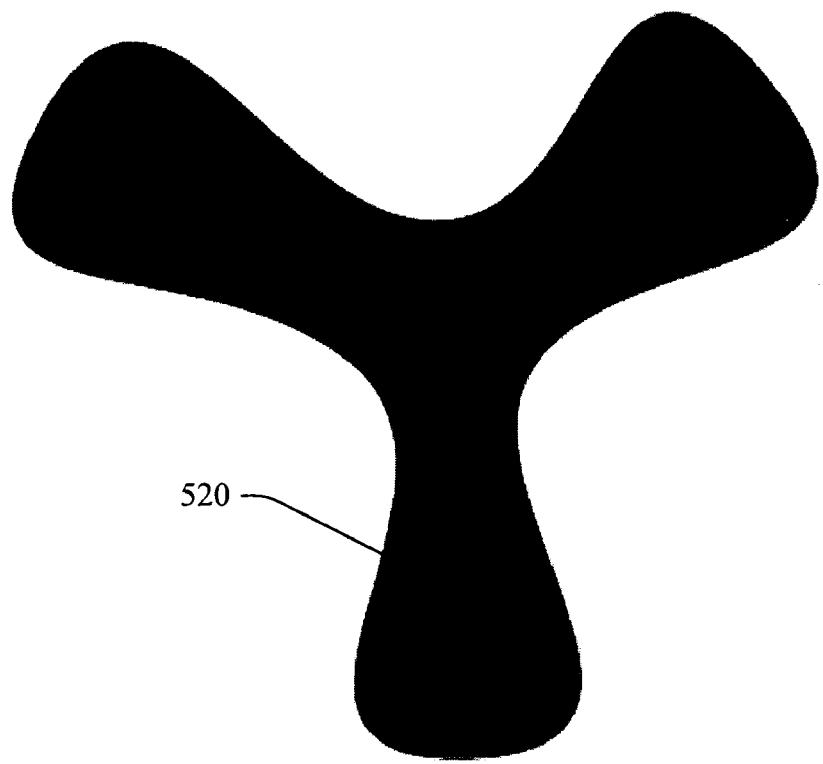

Referring to FIG. 5, an exemplary system input 510 comprising an outer boundary curve of uniform color and no feature curves is illustrated in accordance with an aspect of the present invention. The resulting color gradient path (e.g., generated by the system 100) consists of a uniformly-colored filled area 520.

Figure 6:
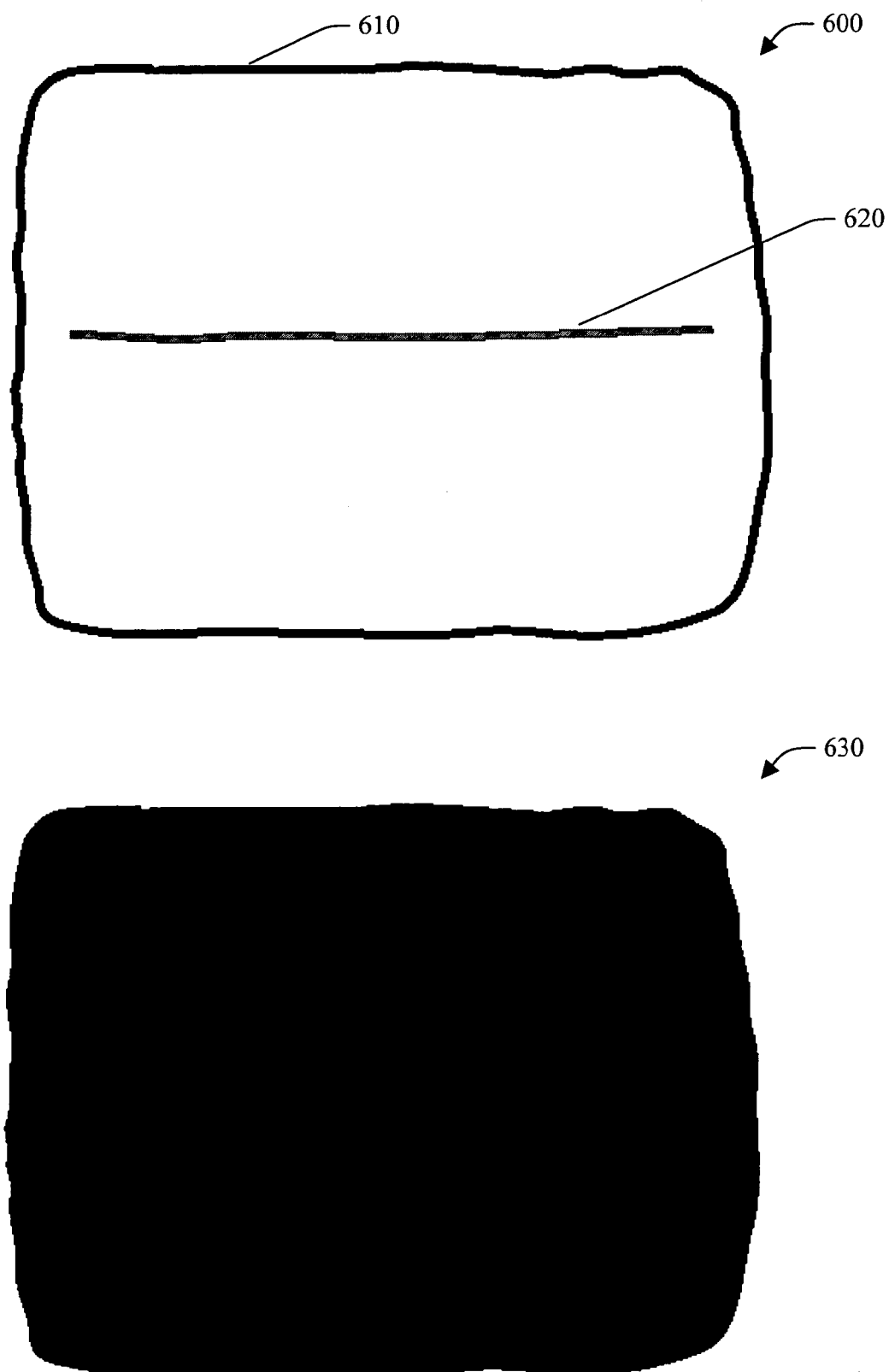
FIG. 6 is a diagram of an exemplary system input comprising an outer curve and an inner curve and an associated system output in accordance with an aspect of the present invention.
Figure 7:
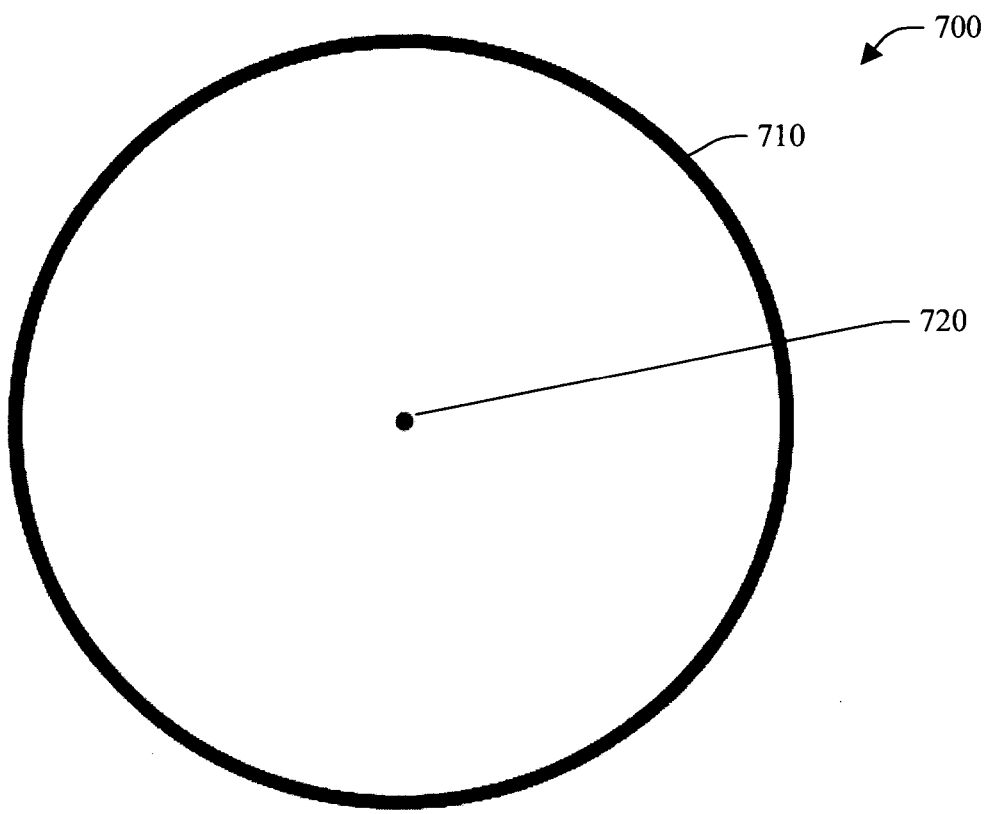
FIG. 7 is a diagram of an exemplary system input comprising a circular outer boundary curve and a feature curve and an associated system output in accordance with an aspect of the present invention.
Figure 7:
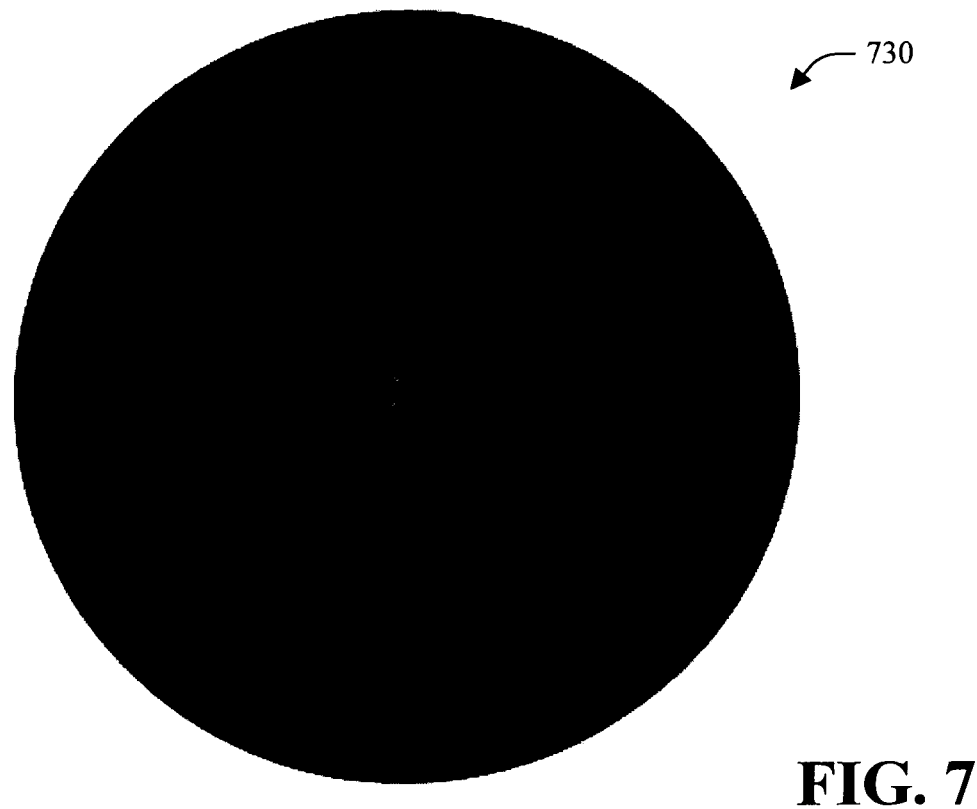

Next, FIG. 6 illustrates an exemplary system input 600 comprising an outer boundary curve 610 and a feature curve 620 in accordance with an aspect of the present invention. The system output 630 (e.g., generated by the system 100) is a smooth color gradient. FIG. 7 illustrates an exemplary system input 700 comprising a circular outer boundary curve 710 and a feature curve 720 (e.g., substantially a point). The system output 730 comprises a smooth color gradient.

Figure 8:
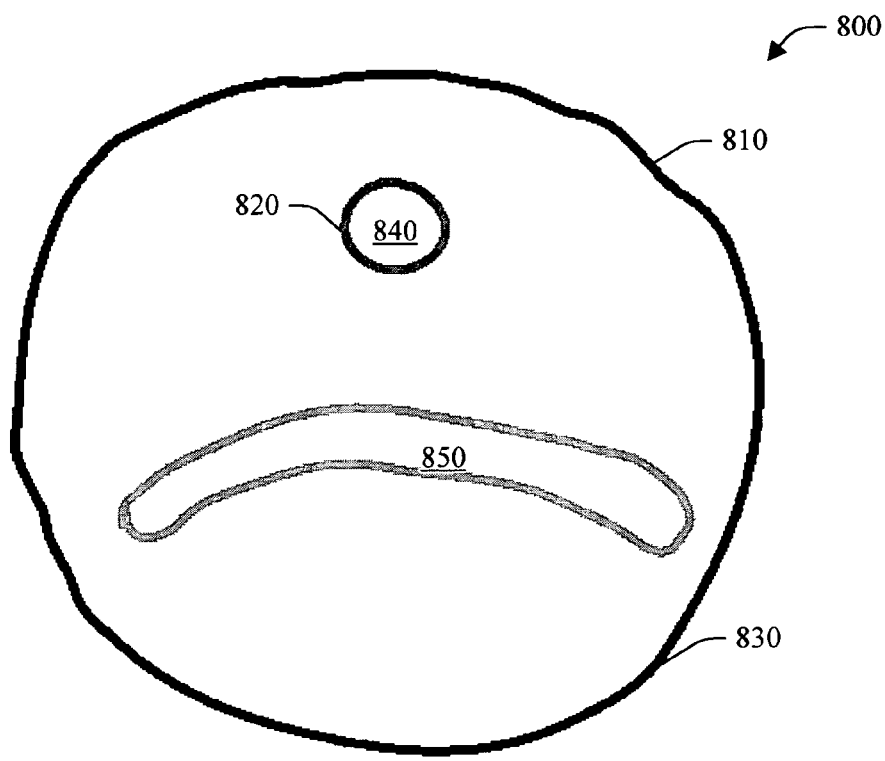
FIG. 8 is a diagram of an exemplary system input and an associated system output in accordance with an aspect of the present invention.
Figure 8:
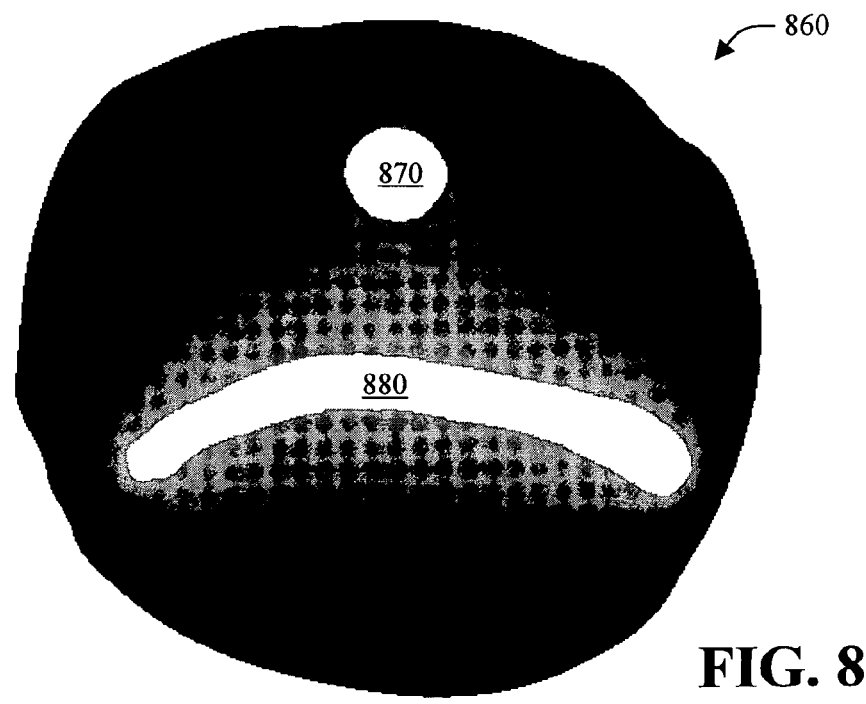

Referring to FIG. 8, an exemplary system input 800 in accordance with an aspect of the present invention. The system input 800 includes an outer boundary curve 810, a first feature curve 820 and a second feature curve 830. In this example, the first feature curve 820 and the second feature curve 830 have been designated as holes 840, 850. The system output 860 includes a smooth color gradient with two corresponding holes 870, 880.

Figure 9:
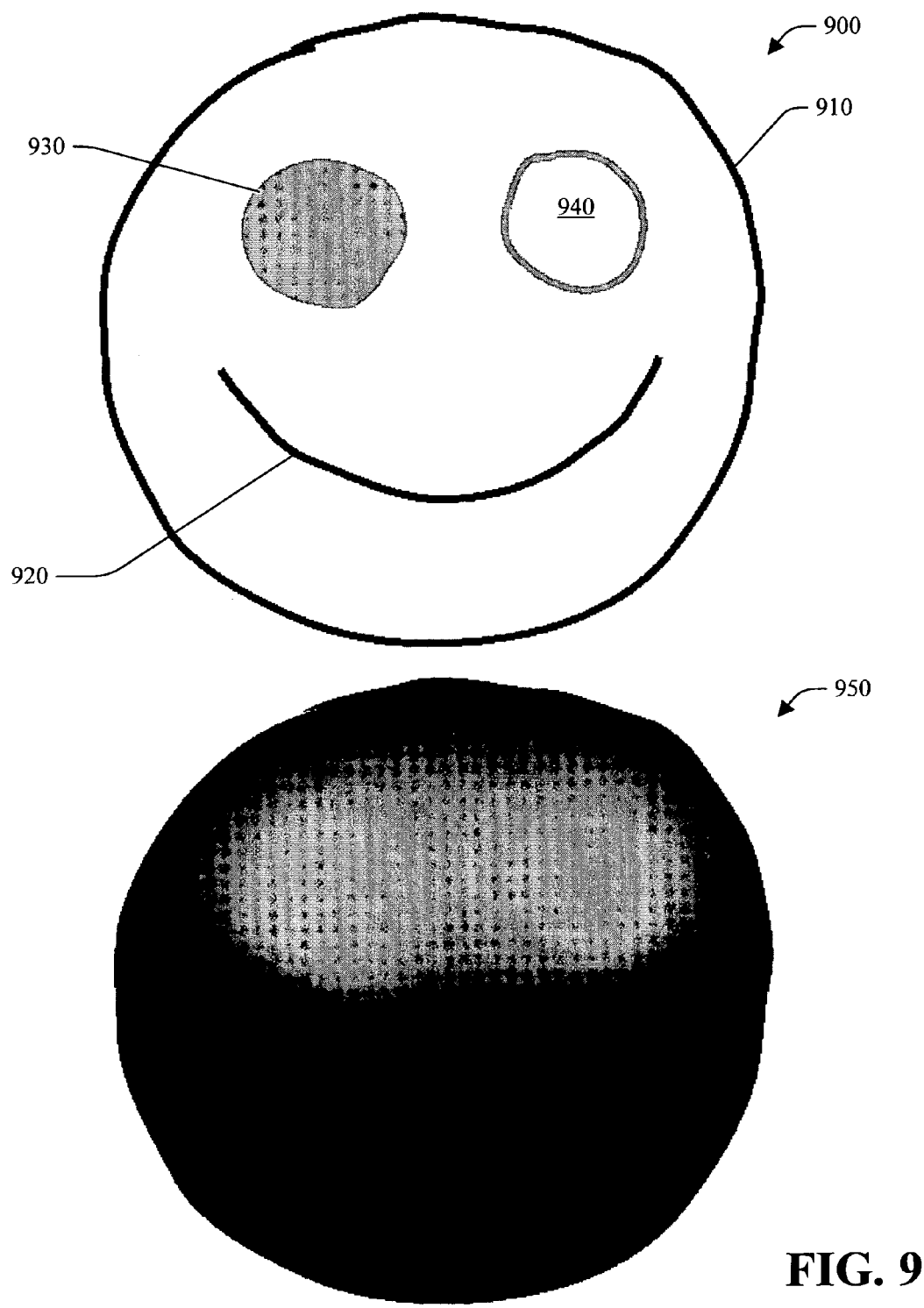
FIG. 9 is a diagram of an exemplary system input and associated system output in accordance with an aspect of the present invention.

Next, FIG. 9 illustrates an exemplary system input 900 in accordance with an aspect of the present invention. The system input 900 includes an outer boundary curve 910, a first feature curve 920, a second feature curve 930 and a third feature curve 940. In this example, the second feature curve 930 and the third feature curve 940 have been designated to be filled with substantially the same color as their outer boundaries, respectively. The system output 950 includes a smooth color gradient.

Returning to FIG. 1, the system 100 includes an input component 110, an intermediate representation component 120 and a gradient generator 130. The input component 110 receives information associated with one or more outer boundary curves (e.g., paths), zero or more feature curves (e.g., paths), and colors along each curve. For example, the input component 110 can receive information based, at least in part, upon user input from a keyboard, PDA, tablet personal computer, touch screen, mouse, joy stick, graphic tablet and/or pointing device. The outer boundary curves and/or feature curves can be represented in any suitable form such that the colors along the curves are defined and/or can be calculated (e.g., by interpolation) from the information presented. For example, cubic Bèzier curves, splines, polylines, solutions to implicit equations (e.g., $f(x,y)=c$, where $c \in \Re$ is some constant and $f: (\Re, \Re) \rightarrow \Re$), parametric curves and the like can be employed as representations of the boundary curves and/or feature curves. Thus, those skilled in the art will recognize that any suitable representation of the boundary curves and/or feature curves can be utilized in accordance with the present invention.

For example, to create a smooth color gradient using the system 100, a user (not shown) can draw any number of boundary curves and/or feature curves. In contrast to linear and radial gradients, which can generally handle only a single straight line segment, the system 100 can handle any quantity and kind of two-dimensional curves.

The boundary curves and feature curves are sometimes referred to herein as "gradient paths." The system 100 can employ these gradient paths to construct a smooth color gradient using one or more boundary curves (e.g., closed paths) and zero or more feature curves. Generally, each boundary curve has no endpoints and encloses an area.

Additionally, a path can intersect with itself or other paths. For example, if there are multiple associated colors at path intersections, the user can specify the appropriate behavior. In one example, the user can choose to average colors, ignore colors, or the like. In another example, the system 100 can remove self-intersections by cutting up a path into smaller pieces (e.g., based, at least in part, upon a user's preferences).

The input component 110 receives two-dimensional information defining the spatial location of the gradient paths. In addition, the input component 110 receives information specifying the colors associated with the gradient paths. These colors may be specified in any color space. In one example, the system 100 represents colors in grayscale (one-dimensional) form, which makes the process of constructing a color gradient simpler and faster. In another example, the system 100 represents colors in a commonly used three-dimensional color space, such as red, green, blue (RGB) color space; hue, saturation, value (HSV) color space; hue, lightness, saturation (HLS) color space; CIE L*a*b* color space; or CIE XYZ color space. It is to be appreciated that the system 100 can also represent colors in a higher-dimensional color space, such as cyan, magenta, yellow, black (CMYK) color space, or using an approximation of color spectra.

The intermediate representation component 120 may convert the input color information from one color space to another color space more suitable for the gradient generator 130. In addition, the intermediate representation component 120 may transform the boundary curve(s) and/or feature curve(s) into an intermediate representation suitable for use with the interpolation method(s) employed by the gradient generator 130. As discussed below, the intermediate curve representation is optional if the gradient generator 130 relies on an interpolation method that can operate directly on the original boundary curve(s) and/or feature curve(s).

For example, for a vector-based interpolation method, the intermediate representation component 120 can provide an intermediate representation based, at least in part, upon polylines used to approximate the boundary curve(s) and/or feature curve(s). Further, for a pixel-based PDE method, the intermediate representation component 120 can provide an intermediate representation based, at least in part, upon a regular grid or an irregular mesh that includes approximations of the boundary curve(s) and/or feature curve(s).

For interpolation methods that rely on approximations of the curves, the gradient generator 130 receives the intermediate representation of the boundary curve(s) and/or feature curve(s) from the intermediate representation component 120. It is to be appreciated that for interpolation methods that operate directly on input curves (e.g., boundary curve(s) and/or feature curve(s)), the gradient generator 130 receives the input curve(s) directly from the input component 110. The gradient generator 130 generates color gradient(s) that can be stored in one or more representations (e.g., raster grid and/or triangulation with colors defined at vertices of triangles). The color gradient(s) can be generated using standard computer graphics hardware and/or software rendering technique(s).

In one example, the gradient generator 130 employs a vector-based interpolation method. This method eschews rasters and pixels in favor of the more inherently resolution-independent vectors. A planar mesh of non-overlapping triangles (a triangulation) is employed to represent the gradient path solution (e.g., color gradient). The triangulation includes a set of triangles with a color defined at each vertex of each triangle. To display the triangulation in a resolution-independent fashion, the Gouraud-shaded triangle drawing capability of conventional graphics cards can be utilized.

The use of a triangulation can be beneficial, for example, as the color gradient can be magnified to any degree without the appearance of pixellated artifacts. However, under certain circumstances, the solution can lack accuracy. This is analogous to the problem of sampling a smooth curve with line segments, especially in the context of drawing it on a display.

Figure 12:
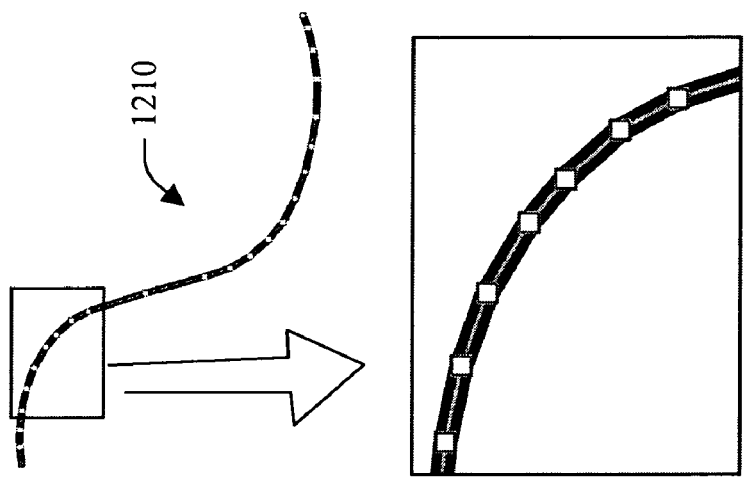
FIG. 12 is a diagram of another linear approximation of the input curve depicted in FIG. 10 in accordance with an aspect of the present invention.
Figure 11:
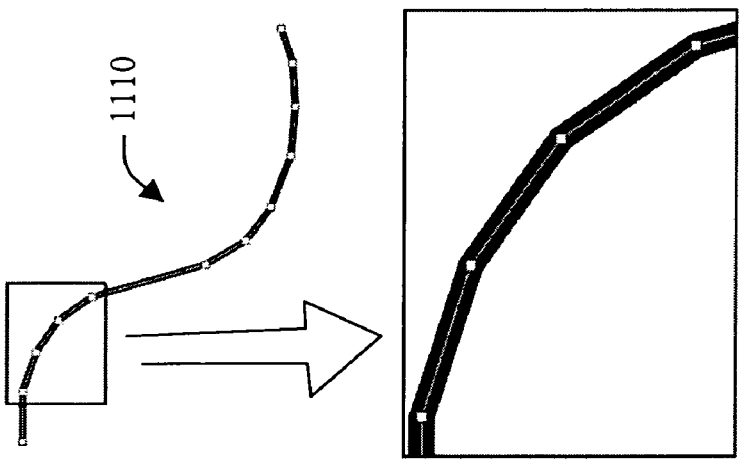
FIG. 11 is a diagram of a linear approximation of the input curve depicted in FIG. 10 in accordance with an aspect of the present invention.
Figure 10:
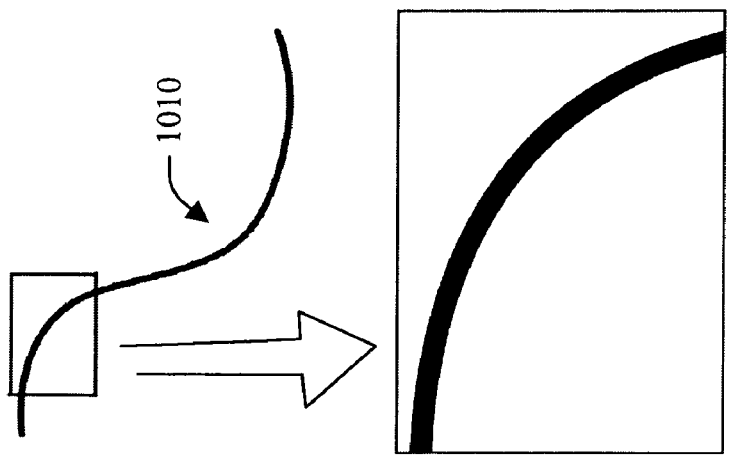
FIG. 10 is a diagram of an exemplary input curve in accordance with an aspect of the present invention.

Referring briefly to FIGS. 10-12, linear approximations of an input curve 1010 and associated magnified portions of the linear approximations are illustrated. Turning to FIG. 10, an exemplary input curve 1010 in accordance with an aspect of the present invention is illustrated. The magnified portion illustrates a smooth curve without approximation. Next, referring to FIG. 11, a linear approximation 1110 of the input curve 1010 in accordance with an aspect of the present invention is illustrated. In this example, as shown in the magnified portion, the piecewise linear approximation of the input curve 1010 is coarse, resulting in a perceivable lack of accuracy. Referring to FIG. 12, another linear approximation 1210 of the input curve 1010 in accordance with an aspect of the present invention is illustrated. To make the magnified piecewise linear approximation of the input curve 1010 appear smooth, the number of sampling points has been increased.

Returning to FIG. 1, the sampling analogy depicted in FIGS. 10-12 can be extended to a gradient generator 130 that employs a vector-based gradient path interpolation: The visual fidelity of a triangulated gradient path approximation can be maintained under magnification (e.g., at substantially all resolutions) by refining the approximation to improve its accuracy. Just as FIGS. 10-12 depict a progression of increasingly accurate piecewise-linear approximations of a curve, so too can a gradient generator produce a progression of increasingly accurate triangulated approximations of a color gradient.

In one example, a valid color gradient is maintained at each intermediate step of refinement. However, the color gradient generally starts out as a coarse approximation of the perfect solution, and several refinement steps are then applied to improve this approximation.

Figure 13:
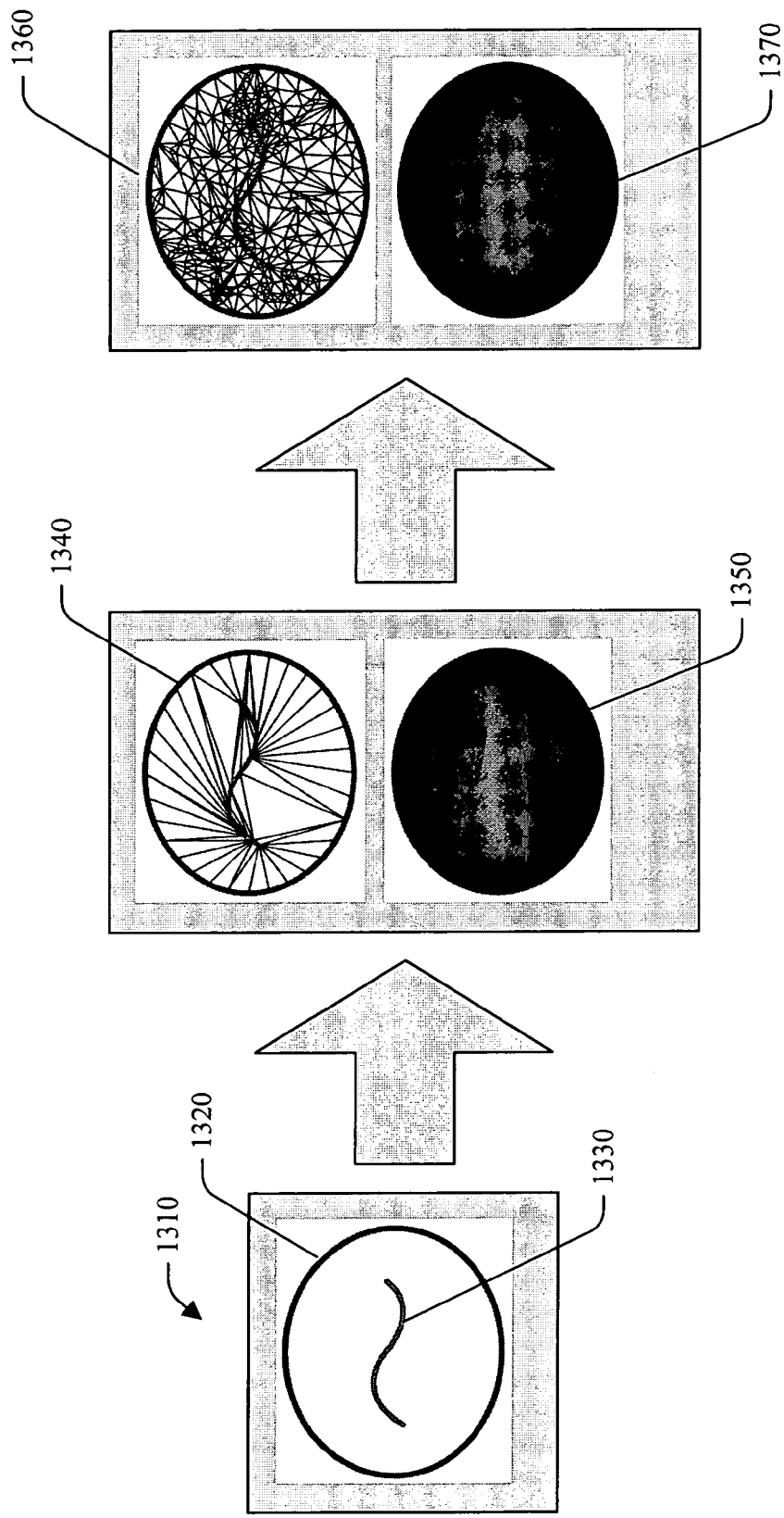
FIG. 13 is diagram of a progression of an exemplary system input through an initial triangulation and refinement triangulation in accordance with an aspect of the present invention.

Turning to FIG. 13, a progression of an exemplary system input 1310 through an initial triangulation and refinement triangulation in accordance with an aspect of the present invention is illustrated. The system input 1310 includes an outer boundary curve 1320 and a feature curve 1330. An initial triangulation 1340 generated by the gradient generator 130 and an associated coarse color gradient 1350 are depicted in FIG. 13. Further, after several refinement iterations, a refined triangulation 1360 generated by the gradient generator 130 and an associated smoothed color gradient 1370 are illustrated.

Turning briefly to FIGS. 14, 15, 18 and 19, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 14:
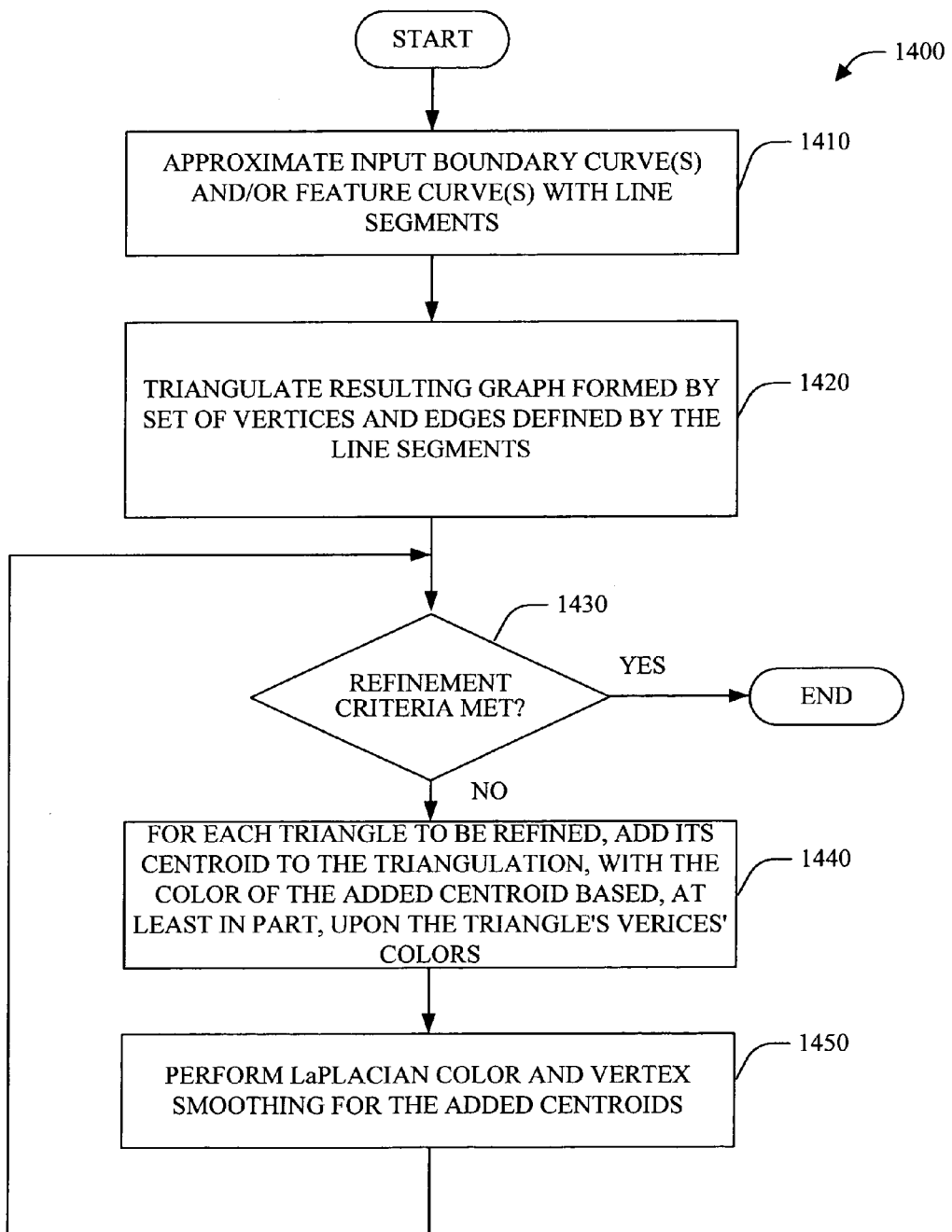
FIG. 14 is a flow chart of a vector-based interpolation method facilitating generation of a color gradient in accordance with an aspect of the present invention.

Turning to FIG. 14, a vector-based interpolation method 1400 facilitating generation of a color gradient in accordance with an aspect of the present invention is illustrated. At 1410, input boundary curve(s) and/or feature curve(s) are approximated with line segments (e.g., by the intermediate representation component 120). At 1420, a resulting graph formed by the set of vertices and edges defined by the line segments are triangulated (e.g., by the gradient generator 130).

At 1430, a determination is made as to whether refinement criteria have been met. In one example, the refinement criteria can be based, at least in part, upon an error threshold. In another example, only non-input edges are permitted to be refined. For example, the refinement predicate can be defined as:

$$\text{ShouldRefine}(t) = \|\max(\Delta c_i)\|^2 > (\Delta_{max})^2, \quad (1)$$

where t is a triangle, $\Delta_{max}$ is a threshold (e.g., arbitrary), and $\Delta c_i = c_{0i} - c_{1i}$, with $c_{0i}$ and $c_{1i}$ defined as the average color across each diagonal formed by the quadrilateral of the two triangles neighboring the $i^{th}$ edge. Thus, in this example, the decision to refine is based on the approximation error of a triangle, taking its three neighboring triangles into account. Refinement can further be used to improve the solution for the purposes of resolution-independence. For example, the error threshold used in the ShouldRefine(·) predicate can be decreased proportional to the increase in resolution, since smaller approximation errors become more apparent as the resolution at which the color gradient is viewed increases.

If the determination at 1430 is YES, no further processing occurs. If the determination at 1430 is NO, then each triangle in need of refinement is split to produce more triangles at 1440. In this example, refinement of a triangle is accomplished by adding the centroid of the triangle (e.g., intersection of medians which connect vertices of the triangle to opposite midpoints) to the triangulation. The color of the newly introduced centroid is based, at least in part, upon the colors of the triangle's vertices (e.g., substantially equal to the average of the triangle's vertices' colors). At 1450, the colors and positions of the newly added centroids are blended with the colors and positions of surrounding vertices, in this example using Laplacian smoothing, and processing continues at 1430. It is to be appreciated that other methods of refining the triangulation (e.g., splitting edges rather than triangles) and other methods of smoothing the colors and positions of vertices are also possible.

Referring back to FIG. 1, additionally and/or alternatively, the gradient generator 130 can employ a partial differential equation (PDE) based interpolation method. The PDE approach may operate on an irregular triangle mesh, on a regular grid of vertices, or on a raster bitmap containing a rectangular grid of pixels. In the case where the solution's domain is a fixed-resolution raster, the solution will only appear as smooth as the raster's resolution permits. Thus, in one example, no additional perceivable benefit is obtained by computing the solution at a resolution higher than that of the user's display (e.g., CRT, LCD, etc.). The problem then becomes that of re-calculating the solution when the paths are magnified so that they occupy a larger portion of the display. In that case, the resolution of the original solution becomes coarser than that of the display, and so the solution is re-calculated at a higher resolution. To do this quickly, full re-calculation can be avoided by exploiting the existing partial solution in various ways as discussed below.

Figure 15:
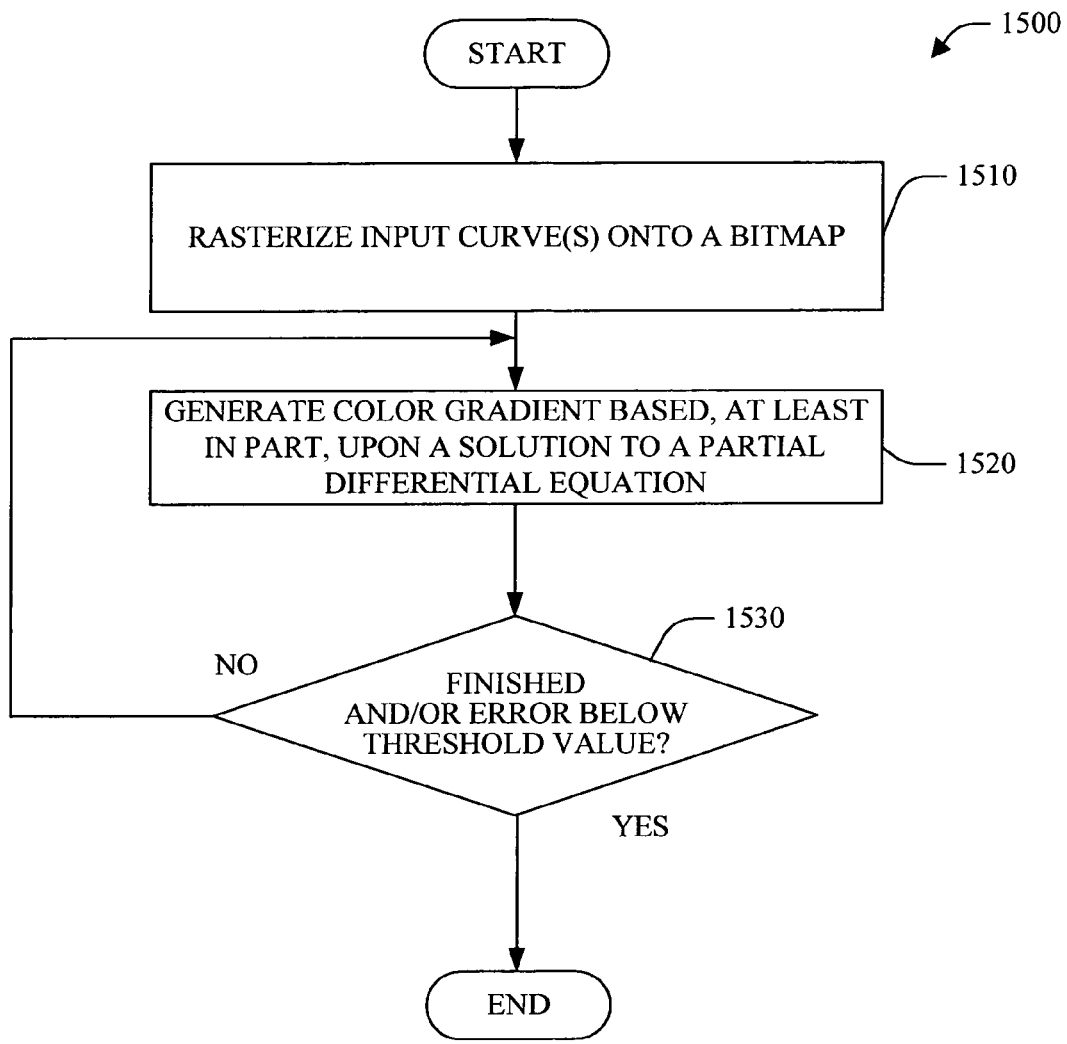
FIG. 15 is a flow chart of a PDE-based interpolation method facilitating generation of a color gradient in accordance with an aspect of the present invention.

Turning briefly to FIG. 15, a PDE-based interpolation method 1500 facilitating generation of a color gradient in accordance with an aspect of the present invention is illustrated. At 1510, input curve(s) (e.g., boundary curve(s) and/or feature curve(s)) are rasterized onto a bitmap (e.g., by an intermediate representation component 120). At 1520, a color gradient is generated based, at least in part, upon a solution to a partial differential equation. At 1530, a determination is made as to whether the PDE solution is finished and/or an error is less than a threshold value. If the determination at 1530 is NO, processing continues at 1520. If the determination at 1530 is YES, no further processing occurs.

Returning to FIG. 1, with regard to the PDE interpolation method, the overall approach is to propagate color information from the pixels for which color information is known to those pixels (in the interior) for which color information is not known. In other words, solving the PDE results in the correct propagation of color to fill in the unknown parts of the image. For example, the desired result can be the solution of Laplace's equation (e.g., an elliptic PDE). For the two-dimensional case, the equation is:

$$\nabla^2 u = \frac{\partial^2 u}{\partial x^2} + \frac{\partial^2 u}{\partial y^2} = 0 \quad (2)$$

This equation encodes the boundary value problem (BVP) being solved by the gradient generator 130. The boundary in this case is the set of curves for which color information is known, that is, the outer boundary curve and any feature curve(s). The problem is then to "fill in" the unknown pixel colors in the region delimited by this boundary using the information defined on the boundary.

There are several well-known approaches to solving this PDE: (1) finite differences, (2) successive over-relaxation (SOR), and/or, (3) multi-grid solvers. In one example, the SOR implementation is employed. In another example, the multi-grid solver implement is utilized. The multi-grid implementation can provide a multi-resolution method which enables faster re-calculation at progressively higher resolutions. In other words, dynamic re-calculation of a PDE solution at arbitrarily higher resolutions can be provided by applying multi-grid steps to obtain a refinement of the coarse solution. This enables a fast method for resolution-independent redrawing of the gradient path interpolation.

Figure 16:
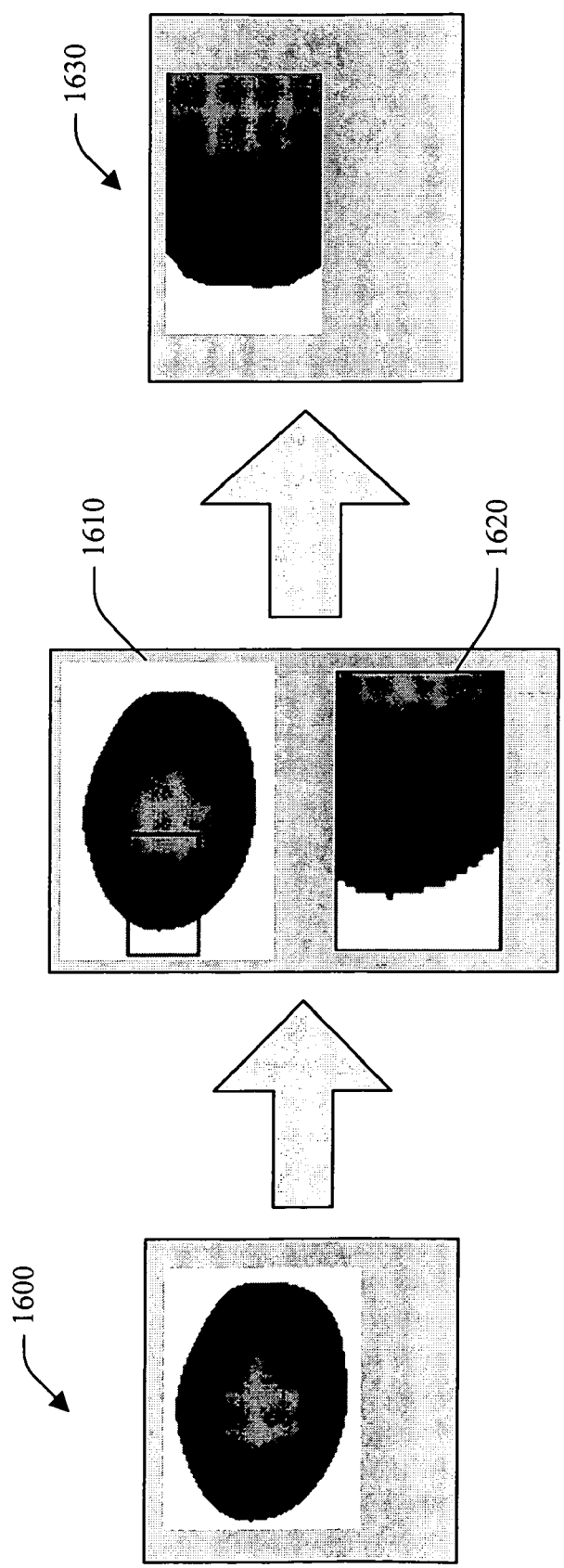
FIG. 16 is a diagram of a progression of a PDE solution image in accordance with an aspect of the present invention.

In one example, in order to make the PDE approach resolution-independent, the PDE solution is dynamically re-calculated at the resolution of the display (e.g., when the solution resolution is determined to be too coarse). Referring briefly to FIG. 16, an initial PDE solution image at screen resolution 1600 is illustrated. As the solution is magnified, the solution image 1610, 1620 appears coarse. The PDE solution can be re-calculated and solved at a higher resolution (e.g., to match the screen resolution to mitigate coarseness). An exemplary re-calculated solution image 1630 is depicted in FIG. 16.

Returning to FIG. 1, in another example, the PDE solution is triangulated, that is, the triangulation is used for rendering and/or re-calculating the PDE solution at higher resolutions thus exploiting the stored coarse solution as an initial approximation, then re-triangulated for display. This approach can save processing, since triangulation has the benefits explained for the vector-based approach. Hence, this method of resolution-independence is functionally equivalent to the dynamic re-calculation method described above, but generally requires fewer re-calculations as resolution is increased.

Those skilled in the art will recognize that the present invention is not limited to two-dimensions. The general case of N dimensions is posed in a similar form (the equation $\nabla^2 u = 0$ in an N-dimensional space expands to a sum of N terms), but the solution procedure becomes more complicated. For example, to achieve analogous results in three-dimensions, the outer boundary is a surface (as opposed to a curve in two-dimensions), and inner boundaries can be any combination of curves or surfaces. Note that gradient path interpolation of three-dimensional boundaries is different from the application of the two-dimension gradient path interpolation to textures on a three-dimensional model.

Thus, while the present invention has been described with regard to two dimensions, those skilled in the art will recognize that the present invention is not so limited. Accordingly, in accordance with an aspect of the present invention, the system 100 can be employed to generate color gradient surfaces with three-dimensional graphical representations.

Figure 17:
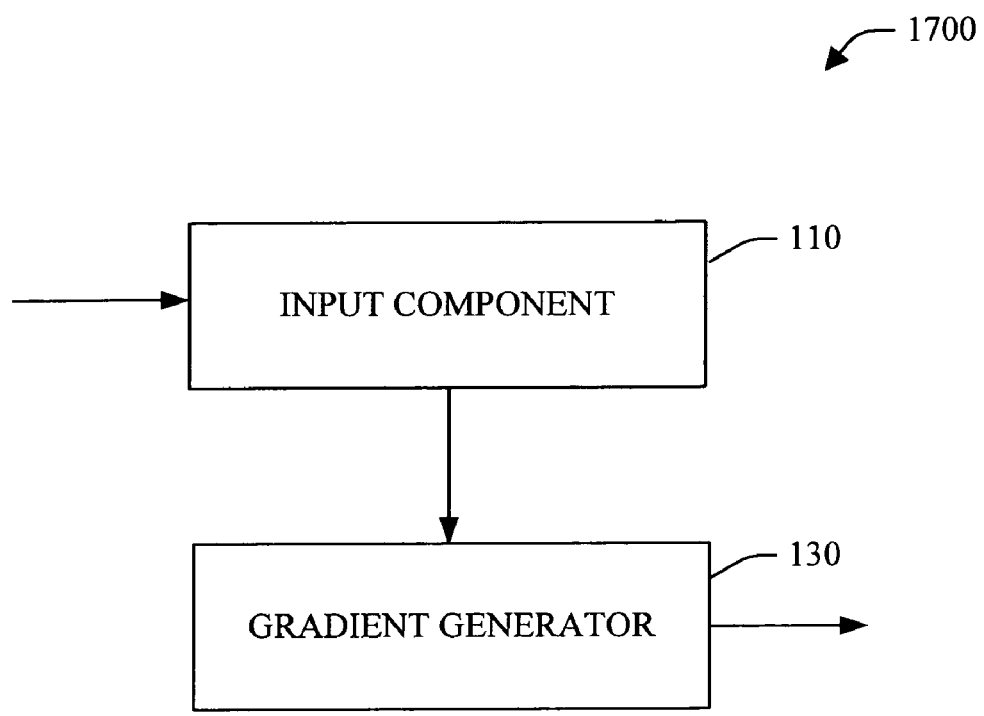
FIG. 17 is a block diagram of a color gradient generation system in accordance with an aspect of the present invention.

Next, turning to FIG. 17, a gradient paths generation system 1700 in accordance with an aspect of the present invention is illustrated. The gradient paths generation system 1700 includes an input component 110 and a gradient generator 130. In this example, the gradient generator 130 employs an interpolation method that operates directly on the input curve(s) (e.g., no intermediate approximation representation). Thus, as discussed previously, the gradient generator 130 receives input curve(s) directly from the input component 110.

Figure 18:
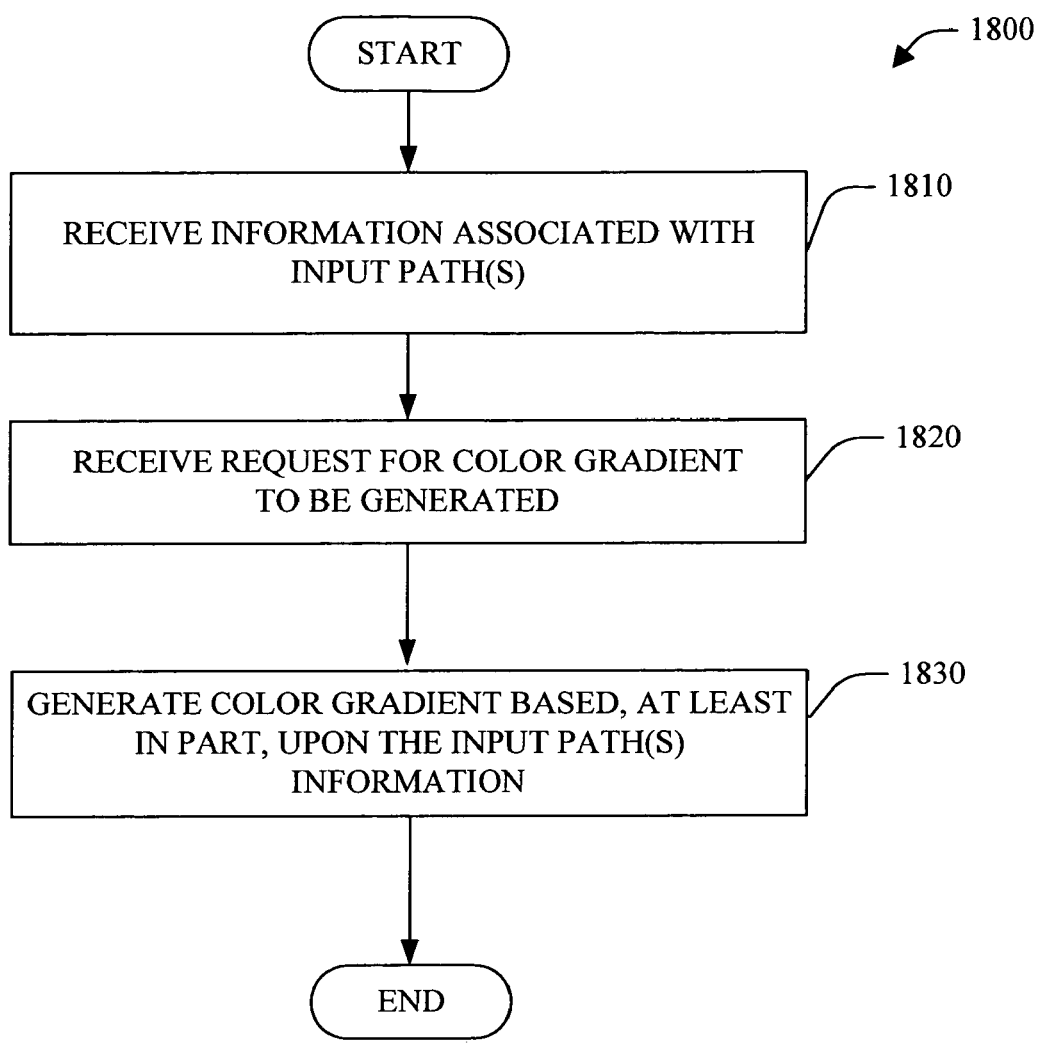
FIG. 18 is a flow chart of a method of generating a color gradient in accordance with an aspect of the present invention.

Referring to FIG. 18, a methodology of generating a color gradient 1800 in accordance with an aspect of the present invention is illustrated. At 1810, information associated with input path(s) (e.g., boundary curve(s), feature curve(s) and color(s)) is received. At 1820, a request for a color gradient to be generated is received (e.g., from a user). At 1830, a color gradient is generated based, at least in part, upon the input path(s) information.

Figure 19:
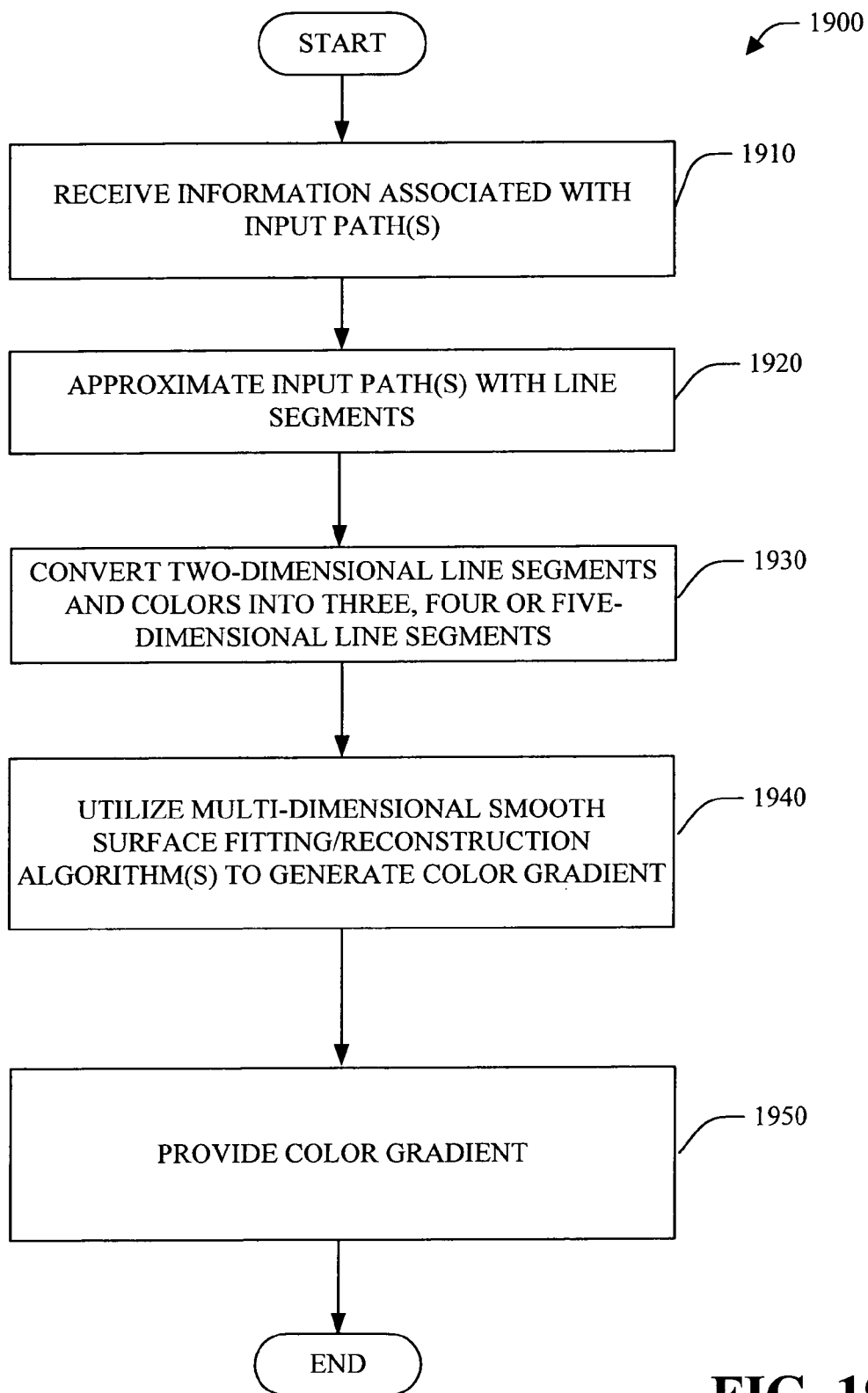
FIG. 19 is a flow chart of a method of generating a color gradient in accordance with an aspect of the present invention is illustrated.

Turning to FIG. 19, a methodology of generating a color gradient 1900 in accordance with an aspect of the present invention is illustrated. At 1910, information associated with input path(s) (e.g., boundary curve(s), feature curve(s) and color(s)) is received. At 1920, the input path(s) are approximated with line segments (e.g., by an intermediate representation component 120). At 1930, the line segments (e.g., two-dimensional) and colors are converted into three, four or five-dimensional line segments. At 1940, a multi-dimensional smooth surface fitting/reconstruction algorithm is utilized to generate a color gradient. At 1950, the color gradient is provided (e.g., to a user).

While FIG. 1 is a block diagram illustrating components for the color gradient paths generation system 100, it is to be appreciated that the gradient paths generation system 100, the input component 110, the intermediate representation component 120 and/or the gradient generator 130 can be implemented as one or more computer components, as that term is defined herein. Thus, it is to be appreciated that computer executable components operable to implement the color gradient paths generation system 100, the input component 110, the intermediate representation component 120 and/or the gradient generator 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 20:
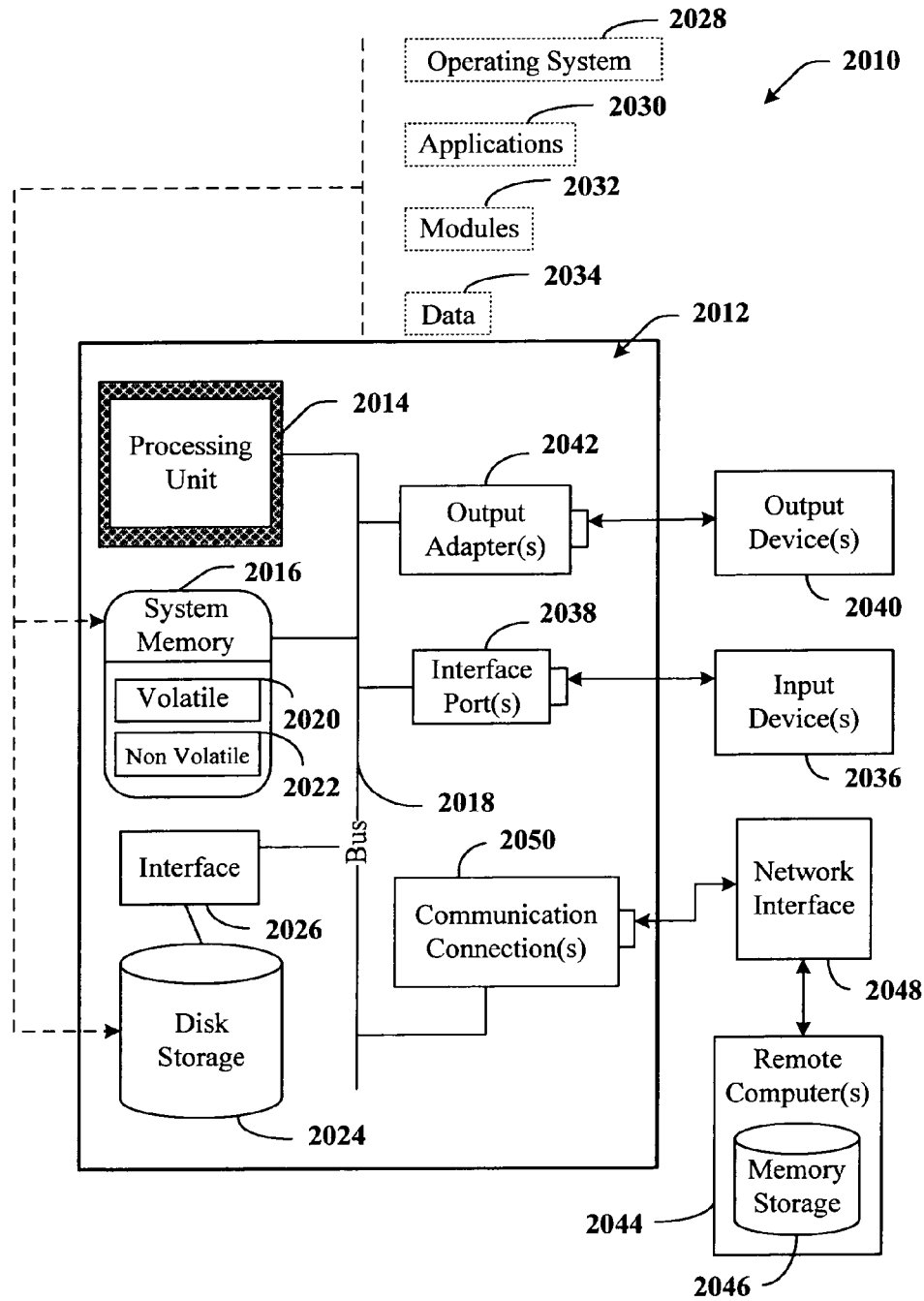
FIG. 20 illustrates an example operating environment in which the present invention may function.

In order to provide additional context for various aspects of the present invention, FIG. 20 and the following discussion are intended to provide a brief, general description of a suitable operating environment 2010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 2010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 20, an exemplary environment 2010 for implementing various aspects of the invention includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable ROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/nonremovable, volatile/nonvolatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the present invention can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers among other output devices 2040 that require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates color gradient generation, comprising:
    an input component that receives information associated with a boundary curve and one or more feature curves, the boundary curve and the one or more feature curves are associated with respective colors; and,
    a gradient generator that employs a partial differential equation interpolation mechanism by utilizing one or more of Laplace's equation, a finite difference approach, a successive over-relaxation approach, and a multi-grid solver approach iteratively until a display resolution-based threshold criterion is satisfied to generate a color gradient based at least in part on the boundary curve, the one or more feature curves, and the respective colors associated with the boundary curve and the one or more feature curves, wherein the interpolation mechanism is based on a variational surface modeling technique and operates without requiring manual generation or editing of a gradient mesh.

2. The system of claim 1, further comprising an intermediate representation component that provides an intermediate approximation of the boundary curve and the one or more feature curves based at least in part on one or more line segments approximating the boundary curve and the one or more feature curves, wherein the gradient generator generates a color gradient based at least in part on the one or more line segments, the one or more feature curves, and the respective colors associated with the boundary curve and the one or more feature curves.

3. The system of claim 2, the intermediate representation component provides the intermediate representation based at least in part on one or more polylines that respectively approximate at least one of the boundary curve or the one or more feature curves.

4. The system of claim 1, the color gradient is stored in a grid representation.

5. The system of claim 1, the color gradient is stored as a triangulation representation with colors defined at vertices of a triangle.

6. The system of claim 1, the gradient generator employs a vector-based interpolation method.

7. The system of claim 1, the boundary curve and the one or more feature curves are rasterized onto a bitmap.

8. The system of claim 1, the boundary curve and the one or more feature curves are non-intersecting.

9. The system of claim 1, further comprising a component that specifies the color gradient as a markup language representation.

10. The system of claim 1, wherein the input component receives at least one of a boundary curve or a feature curve as a cubic Bézier curve, a polyline, a solution to an implicit equation, or a parametric curve 11. A method of generating a color gradient comprising:
    receiving information associated with a boundary surface, one or more feature surfaces and one or more colors respectively associated with the boundary surface and the one or more feature surfaces;
    generating an intermediate approximation of the boundary surface and the one or more feature surfaces based at least in part on respective surface segments thereof; and,
    iteratively utilizing a partial differential equation interpolation method based on a variational surface modeling technique and one or more of Laplace's equation, a finite difference approach, a successive over-relaxation approach, and a multi-grid solver approach to satisfy one or more display resolution refinement criteria to generate a color gradient based at least in part on the surface segments and the colors respectively associated with the boundary surface and the one or more feature surfaces without requiring manual generation or editing of a gradient mesh.

12. The method of claim 11, further comprising receiving a plurality of intersecting boundary surfaces or feature surfaces, and separating the plurality of intersecting surfaces into a set of non-intersecting surfaces.

13. The method of claim 11, further comprising utilizing an intermediate approximation of the boundary surface and the one or more feature surfaces to generate the color gradient.

14. The method of claim 13, the intermediate approximation is based at least in part on one or more surface segments respectively approximating the boundary surface and the one or more feature surfaces.

15. The method of claim 11, further comprising storing the color gradient as a triangulation representation with colors defined at vertices of a triangle.

16. A color gradient generation system comprising:
    means for receiving information associated with a closed boundary curve and one or more non-intersecting color gradient paths enclosed within the closed boundary curve;
    means for identifying one or more colors respectively associated with the boundary curve and the one or more color gradient paths;
    means for filling areas enclosed by respective color gradient paths with respective colors associated with the color gradient paths; and
    means for generating a color gradient for an unfilled area enclosed by the boundary curve by applying a variational surface modeling technique that smoothly interpolates the colors respectively associated with the boundary curve and the color gradient paths within the area for the unfilled area enclosed by the boundary curve without requiring a manually generated or edited gradient mesh corresponding to the unfilled area enclosed by the boundary curve by utilizing a partial differential equation interpolation mechanism and at least one of Laplace's equation, a finite difference approach, a successive over-relaxation approach, and a multi-grid solver approach.

17. The system of claim 1, wherein the boundary curve is a closed curve and the gradient generator generates a color gradient for an area enclosed by the boundary curve.

18. The system of claim 17, wherein at least one feature curve is a closed curve in the area enclosed by the boundary curve and the gradient generator generates a color gradient for a portion of the area enclosed by the boundary curve that is not enclosed by at least one closed feature curve.

* * * * *

UNITED STATES PATENT AND TRADEMARK OFFICE
CERTIFICATE OF CORRECTION

PATENT NO. : 7,427,994 B2  Page 1 of 1
APPLICATION NO. : 11/167882
DATED : September 23, 2008
INVENTOR(S) : Michel J. Gangnet et al.

It is certified that error appears in the above-identified patent and that said Letters Patent is hereby corrected as shown below:

In column 15, line 61, in Claim 10, after "curve" insert -- . --.

Signed and Sealed this
Third Day of May, 2011

David J. Kappos
*Director of the United States Patent and Trademark Office*